Oct. 4, 1966  B. L. HEGEMAN  3,277,372
ELECTRICAL WAVEFORM DISPLAY SYSTEM
Filed June 6, 1960  5 Sheets-Sheet 1

INVENTOR.
BERNARD L. HEGEMAN
BY Darby & Darby
ATTORNEYS

Fig. 2

INVENTOR.
BERNARD L. HEGEMAN
BY
Darby & Darby
ATTORNEYS

Oct. 4, 1966  B. L. HEGEMAN  3,277,372
ELECTRICAL WAVEFORM DISPLAY SYSTEM
Filed June 6, 1960  5 Sheets-Sheet 3

Fig. 3

INVENTOR.
BERNARD L. HEGEMAN
BY
Darby & Darby
ATTORNEYS

Fig. 4

INVENTOR.
BERNARD L. HEGEMAN

BY Darby + Darby

ATTORNEYS

Fig. 5

INVENTOR.
BERNARD L. HEGEMAN
BY Darby + Darby
ATTORNEYS

United States Patent Office 3,277,372
Patented Oct. 4, 1966

3,277,372
ELECTRICAL WAVEFORM DISPLAY SYSTEM
Bernard L. Hegeman, Riverdale, N.J., assignor to Fairchild Camera and Instrument Corporation, a corporation of Delaware
Filed June 6, 1960, Ser. No. 34,124
22 Claims. (Cl. 324—121)

The present invention relates to oscilloscopes, and particularly to cathode ray oscilloscopes. More particularly still, the invention relates to a system for measuring the coordinate dimensions between selected points of an oscilloscope display.

As is well known, a cathode ray oscilloscope comprises a cathode ray tube of usual type having vertical and horizontal deflection plates therein, together with circuits for applying a time base signal to the horizontal plates and a signal to be measured to the vertical deflection plates. Obviously, the applied signal may be derived from any one of the many sources that may represent for example, heartbeats, scanning of a radar map, spark impulses of an internal combustion engine, etc.

The measurement is ordinarily performed by placing upon the face of the cathode ray tube a series of coordinate lines either by placing a sheet of transparent material with the lines ruled thereupon on the tube face, or by ruling the lines directly on the tube face.

The measurement is difficult because of the fact that the coordinate dimensions between selected points are determined visually and the eye is not capable of estimating distances with accuracy. Additionally, it is necessary that the unknown waveform be amplified and that the time base be changed in order to have the optimum relationship between the wave trace and the coordinate scale. This requires adjustment of the oscilloscope and renders it necessary for the operator to utilize the proper scale value for each measurement, that is, this necessitates that the operator not only read correctly the number of scale divisions between selected points along the coordinate lines but also that he compute the value of ascribing the proper scale quantity to each division of the coordinate scale.

My present invention overcomes the disadvantages mentioned above since it provides a means whereby the operator can readily position one or two dots upon selected points of the display and can then read the coordinate dimensions between those two points directly on digital indicators which are utilized in the positioning of the dots, or one of the dots.

Moreover, by my invention these digital indicators are arranged in horizontal alignment and denomination orders as in the well known calculating machines where the indicators are aligned on horizontal shafts in ascending decimal orders reading from right to left. Also, in the oscilloscope of my invention means are provided to indicate the scale value of the digital display and to indicate likewise the position of the decimal point between denominational orders so that no error in calculation or error in recollecting in the setting of the vertical or horizontal digital indicators will affect the result.

It is an object of my invention to provide a cathode ray oscillograph wherein the coordinate dimensions or equivalent distances between selected points on a wave pattern displayed on the face of the tube can be directly indicated on digital display devices.

It is another object of my invention to have units of time and voltage or equivalent quantities indicated by each digital device for each setting of the horizontal and vertical measuring indicators respectively.

It is another object of my invention to directly indicate a position of the decimal point with relationship to the digital wheels or drums so that the coordinate distances may be read in digits with the decimal point in the proper position.

It is a further object of my invention to provide means whereby the rise time of waveform may be directly determined without computing the 10% and 90% amplitude values which are recognized as being the basis for measurement of rise time.

It is a further object of the invention to provide visible dots which may be placed upon a waveform to indicate the points thereon between which the coordinate measurement is to be taken and indicated on the digital indicators.

It is a further object of the invention to provide means for moving the dots and patterns together to any desired position on the face of the display device.

It is a further object of the invention to provide means for moving the dots and the wave pattern relative to each other with the dots maintaining a present relationship.

It is a still further object to provide means as indicated above for moving one dot with respect to the other.

It is a still further object of my invention to provide means whereby the correct value of a measurement shown on the digital indicating device is above mentioned may be transmitted either as a direct digital indication or as an analogue voltage to a distance for use in operating a remotely controlled device such for example as a card punch, printing mechanism, or other similar device.

Other objects and features of the invention will be apparent when the following description is considered with the drawings, in which.

Before proceeding with a detailed description of my invention I wish to point out that the objects thereof may be attained through the use of a single dot or may in a preferred form be attained through the use of two dots, one identified as an index dot and the other as a readout dot respectively, hereinafter designated I and R. The two dot form is preferable since it permits adjustment of the I dot to coincide with a selected portion on the waveform, rather than requiring positioning of the waveform to a predetermined fixed position. In the interest of simplicity, only the two dot form will be described in detail, it being understood that although some simplification could be effected by utilizing the one dot form, this would be at the expense of convenience of operation.

It is obvious that a dot readout system can be used on other forms of image display in addition to cathode ray tube displays; for example on oscillating mirror oscillographic displays, solid state light amplifiers, fluorescent flat wall displays, mechanical scanning disk or mirror displays, or any display which employs light spot imaging as with a Kerr cell. In the further interest of simplicity, however, my invention will be described in reference to a cathode ray oscilloscope, it being understood by those skilled in the art that it is not limited thereto.

Figure 1:
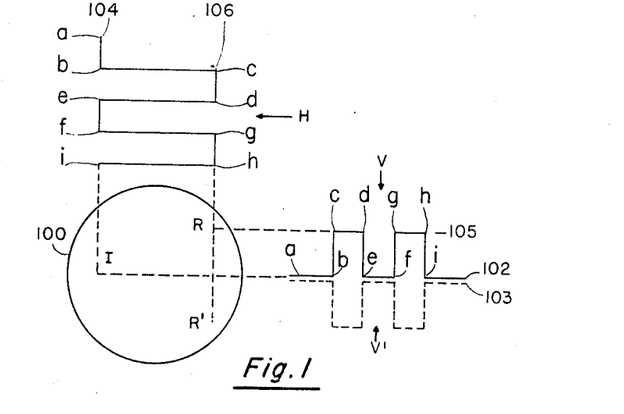
FIG. 1 illustrates the basic concept of my invention.

Referring now to the drawings, FIG. 1 shows a cathode ray tube faceplate 100, on which the dots and display are produced by an electron beam deflecting system. Since the deflection system, per se, is not part of my invention, the following explanation will be conducted in terms of the effect of such a system. To achieve the production of the I and R dots mentioned, I utilize a horizontal deflecting signal (which is shown in FIG. 1 as a square wave H), and a synchronous vertical deflecting signal (shown as square wave V or V'). Reference characters $a$ through $i$ identify the instant at which respective portions of the synchronous waveforms occur.

The H and the solid line V waveforms coact in the following manner. Initially, at instant "$a$," the H waveform positions the electron beam at the left hand portion of the oscilloscope faceplate 100. At the same instant, "$a$," the V waveform causes the electron beam to be positioned on the horizontal center line of faceplate 100.

During interval $a–b$, neither waveform deflects the electron beam from its initial position, and the beam therefore "rests," producing a first, or I dot at the center left-hand portion of the faceplate, which endures for the time interval $a–b$.

During the interval $b–c$, the H waveform causes the electron beam to move rapidly to a position near the right side of the faceplate, while the V waveform causes the beam to move rapidly to a position adjacent the top of the faceplate. Although the beam does not dwell anywhere on the screen 100 for an appreciable time during the short transition period and thus only a small light output results during the transition time; nevertheless since this output may be visible and distracting, blanking as described hereinafter is utilized during the transition interval.

During the interval $c–d$, the H waveform causes the beam to remain near the right-hand edge of the faceplate, while the V waveform causes the beam to remain near the top of the faceplate; thus, during the $c–d$ interval the beam again rests, producing an R dot near the upper right-hand portion of the faceplate.

During interval $d–e$, the H waveform causes the beam to move back to its initial position near the left-hand side of the faceplate, while the V waveform causes the electron beam to move back to the horizontal center line of the faceplate.

During intervals $e–f$ the H waveform causes the beam to remain near the left side of the faceplate while the V waveform causes the beam to remain at the horizontal center line of the faceplate. Again, the beam rests to produce the I dot.

During intervals $f–g$, $g–h$, and $h–i$, the waveforms coact in the same manner as previously explained. The H and V waveforms thus coact to produce dots successively and repetitively in time at the center left-hand and upper right-hand portions of the faceplate. Since the electron beam dwells only at these positions and nowhere else, two dots are produced upon an otherwise dark background.

In accordance with the foregoing explanation, the R dot will be above and to the right of the I dot. Under some conditions, it may be desirable to position the R dot below the I dot. This result may be readily achieved by inverting the V waveform of FIG. 1 so that it takes the form V' shown by the dashed lines and therefore produces dot R'. The operation is the same as previously described.

The position of the I dot may be readily controlled in the following way. Raising the base level 102 of the V waveform (i.e. moving it upwards at $a$, $b$, $e$, $f$, $i$) elevates the I dot on the tube face 100. Similarly, adjusting the base level 104 of the H waveform (as represented at $a$, $b$, $e$, $f$ and $i$) will control the horizontal position of the I dot. Thus the position of the index dot on the faceplate is controlled by the base levels of the H and V waveforms.

The R dot may be positioned relative to the I dot as follows: reducing the amplitude 105 of the V waveform while retaining the same base level will lower the R dot. In a similar manner, changing the amplitude 106 of the H waveform while keeping its base level 104 fixed, will change the horizontal position of the R dot. Thus, if the base levels are constant, the position of the R dot is controlled by the amplitude of the H and V waveforms.

The operation of the circuits of my invention will now be described in reference to the preferred embodiment of FIGURES 2, 3 and 4.

In the usual manner, an amplifier 200 (FIG. 2), which may be of the well-known balanced D.-C. push-pull type, is used to amplify a display wave such as 201 (applied to input terminals 202), portions of which are to be scaled accurately as to elapsed time interval and potential difference, for example.

*Vertical switch*

In my system the display wave 201 is presented on a linear time base, the displayed waveform being applied as usual to vertical deflecting plates 303, 304 (FIG. 3) and the linear time base sawtooth wave S being applied to horizontal deflecting plates 309, 310 of cathode ray tube face 100. An electron beam 305 "writes" the waveform on fluorescent screen 100. Part of the time the display wave is presented, and part of the time the dots I and R are presented, alternately and rapidly enough to prevent flicker, in a time-sharing arrangement. This type of presentation may be accomplished by rapidly switching the display wave 201 and the vertical read-out waves V (or V') simultaneously with the sawtooth wave S (FIG. 3) and the horizontal read-out waves H. Any type of switch can be used, but an electronic switch is preferred, such as the structure shown at 220, which (in the terminology of computer structure) constitutes an "either-or" circuit.

This particular configuration of electronic switch is the subject of an application entitled Dual Electronic Switch Symmetrically Located in Delay Line, Serial No. 64,370, filed October 24, 1960, now Patent No. 3,065,426, in the name of Meyer Maron and assigned to the same assignee as the instant application.

Balanced amplified replicas of display wave 201 are applied with opposite polarities to grids 203, 204 of the display switch tubes 205, 206 which may, for example be triode vacuum tubes as shown. A vertical position control 207 is used to bias grids 203, 204 relative to one another, and independently of any other position controls, to achieve vertical positioning of the display wave ultimately produced on the face 100.

The electronic switch tubes 208, 209 are driven by push-pull square waves 210, 211 at one-half the display frequency (as explained hereinafter), the arrangement shown serving to make tubes 205, 206 non-conductive and tubes 212, 213 conductive during the time in which the positive excursion of 210 and negative excursion of 211 occur, which excursions occur simultaneously and alternately at the display frequency. This action produces alternating cut-off biases applied to tubes 205, 206 and 212, 213 pair by pair, whereby the cathode gain controls 214, 215 are driven to a higher positive potential, alternately and repetitively, than the pair of grids 203, 204 and 217, 216 whenever the respective anodes of diodes 218, 219 are driven to a high positive potential by cathode follower action of tubes 208, 209 energized by waves 210, 211 applied to grids 222, 221 thereof.

The circuit structure shown generally at 220 includes six tubes, and constitutes one form of a time-sharing electronic switch. Although time-sharing is well known in the art, time-sharing utilizing mixing push-pull pairs of tubes is believed to be novel.

The output voltages of tubes 206, 212 are present alternately at a symmetrically located terminal 224, and the outputs of tubes 205, 213 are present alternately at output terminal 223. In this particular embodiment of an operating circuit any push-pull signals applied to the grids of tubes 205, 206 appear as push-pull signals in the plate circuits thereof so that for the time when 205, 206 are conductive, the push-pull display signals applied to grids 203, 204 appear at terminals 223, 224, and for the time when tubes 212, 213 are conductive, dot producing signals applied to grids 217, 216 appear at terminals 223, 224. Thus the display and the dot producing signals appear alternately at the same terminals.

The switching signal waves 210, 211 alternately make tube pairs 205, 206 and 213, 212 conductive as explained heretofore. This switching action causes alternate paired plate current cut-offs and produces inverted, amplified replicas of waves 210, 211 at anodes 226, 227 respectively. Due to the symmetrical rectangular form of these waves, they are made to cancel exactly at push-pull output terminals 224 by relative potentials applied to gain controls 214, 215 to balance the switch wave amplitudes at anodes 226 and 227. With the symmetrical arrangement of anode circuits shown, these same potentials (achieved by relative values of cathode resistors 282, 283, 284, 285) balance the switch wave amplitudes at push-pull output terminals 223 so that only a negligible switching transient, whose magnitude depends on close (½%) tolerance of components, appears at push-pull grids 228, 229 and is transmitted through the balanced push-pull D.-C. amplifier 308 to the deflecting plates 304, 303. When wave 210 is positive the read-out dots appear on tube face 100, and when wave 211 is positive the display wave appears thereon.

As will be clear to those skilled in the art, this feature of the invention is not limited to the use of signal waves 210, 211 in which the positive and negative excursions are of equal duration, but is equally operative for any rectangular waveform in which the excursions differ from one another in their durations.

*Master clock*

Turning now to the square wave generator 230, hereinafter called the "master clock," a bistable multivibrator flip-flop arrangement (the operation of bistable and monostable multivibrators is well known in the art, see p. 164–166 of MIT Radiation Lab. Series, vol. 19, "Waveforms," McGraw Hill, 1949) has been shown which is particularly suitable to produce the square waves 210, 211 for driving the switch tubes 208, 209.

The production of waves 210, 211 is as follows: the anodes of a pair of diodes 231, 232, are connected to grids 233, 234 of tubes 235, 236 of the master clock and the cathodes of 231, 232 are connected to the output terminal 237 of pulse shaper 238. This pulse shaper produces a negative pulse wave 239, which, in this embodiment, is synchronized with the periodicity T of the display wave 201. The display wave is supplied through capacitor 240 to a sync amplifier 241.

Amplifier 241 may contain well known differentiating and/or integrating circuits to produce a pulse wave at output connection 242, occurring with the display periodicity T, to synchronize the sweep generator 306. A sweep blanking pulse is synchronized from 306 via connection 243 to a blanking generator 244. Generator 244 is preferably a conventional monostable multivibrator with plus and/or minus blanking pulse output of general form 245 with period T (FIG. 2), but with duration T' corresponding with the "dead-time" of sweep wave S generated in 306 (FIG. 3), at output conductor 246. A second signal, synchronous with 245 on conductor 247, is utilized to drive and synchronize pulse generator and shaper 238 (which may be also a conventional multivibrator) to produce a shaped sync pulse 239, with the same period as the display.

The cathodes of diodes 231, 232 are driven negatively by pulses 239 which serve to drive the anodes 249, 250 of tubes 235, 236 of the bistable master clock 230 producing waveforms 211 and 210 which are 180° out of phase.

The potential limits of waves 210, 211 are determined in the positive direction by the conduction of diodes 251, 252 and by the potential of source 248; and in the negative direction by the conduction of diodes 254, 253 and the potential of source 259.

Cathode followers 255, 256 and diodes 257, 258 serve to transmit the generated switch waves 210, 211 present at anodes 249, 250 to the switch tube grids 221, 222 and to other utilization points which will be described.

*Read-out wave generator*

For purposes of reading out amplitude and time interval of selected portions of the display wave, a read-out rectangular wave generator (preferably a square wave generator) is provided. This generator may be a bistable multivibrator 400. Preferably generator 400 is arranged to oscillate at a recurrent frequency of 383 cycles, approximately, with a half-period $t$, as shown in FIG. 4. In the arrangement shown, generator 400 produces square waves whose frequency wobbles about the mean value of approximately 383 cycles, chosen to prevent undesirable beats in the display intensity of the read-out dots at all display frequencies including harmonics of 60 cycles up to the large prime number 383. A larger prime number, such as 2003 for example, would be even better for the purpose, because in a display whose frequency is 60 times the frequency of generator 400, one of the read-out dots heretofore described will disappear and limit the usefulness of this read-out system. A frequency of 383 is utilized however because of the difficulty of generating true rectangular waves at higher frequencies.

In case the display wave frequency is exactly twice the read-out wave frequency, the master clock switch waves which are at one-half display frequency coincide with the read-out waves.

In this case only the high amplitude level or the base level of H and V will occur repetitively, and only the R dot or the I dot will be produced, not both. If waves 210, and H and V, are in phase, intervals $c$–$d$ and $g$–$h$ (FIG. 1) will be switched in to create the R dot. If the waves 210 and H and V are 180° out of phase, intervals $a$–$b$, $e$–$f$ will be switched in to create the I dot.

Accordingly, a free-running 766-cycle negative pulse wave 407 is generated at anode 401 of tube 402 in monostable multivibrator 403 and coupled through capacitor 404 to the input cathodes of diodes 405, 406 of read-out wave generator 400, to synchronize this generator in bistable manner at 383 cycles. The grid 419 of tube 402 is connected to the ungrounded terminal 408 of the secondary of heater transformer 409, the terminal 410 being connected to ground. These connections cause the 766-cycle wave 407 to be frequency modulated at 60 cycles, and thus the 383-cycle waves H and V wobble about the mean value of 383 cycles, preventing the disappearance of either dot (I or R) at display frequencies below $60 \times 383$, or 22,980 cycles.

The generated waves H, V, are caused to appear at anodes 411, 412 by the bistable response of multivibrator 400 to negative pulses. The square waves H, V are 180° out of phase as generated, and are clamped to a fixed base potential, preferably negative and near ground potential, by clamping diodes 413, 414; and to a fixed positive potential by clamping diodes 415, 416. Because the forward impedance of the diodes is preferably low, of the order of 200 ohms, the amplitude of H and V is determined by the positive potential source 417, preferably of the order of 100 volts. Waves H and V are also shown in FIG. 1, the half period interval $t$ corresponding to the intervals $c$–$d$, $g$–$h$, etc. of FIG. 1. The function of these waves is to create the dots, as has been explained.

The proper phase relations shown in FIG. 1 are achieved by properly choosing the number of polarity reversing amplifiers included between anode 411 and the H-deflecting plate pair 309, 310 with respect to the number of polarity reversing amplifiers included between anode 412 and the V-deflecting plate pair 303, 304. In this embodiment there is an odd number of reversing amplifiers in the horizontal channel and an even number in the vertical channel; although the opposite arrangement is equally effective.

The H-amplitude intervals $c$–$d$, $g$–$h$, etc., and the V-amplitude intervals $c$–$d$, $g$–$h$, etc. which produce the R dot, are controlled respectively by the positions of the H-read-out manual switch 318 and the V-read-out manual switch 418. The switches 318 and 418 and their operation are described hereinafter.

The H-wave base level 104 is determined by the D.-C. component (forming a pedestal upon which the A.-C. read-out square wave is placed), as shown at 104 and 106 in FIG. 1; likewise, the V-wave base level 102 is a D.-C. component.

*Positioning of index and read-out dots relative to pattern*

An important feature of my invention is the positioning of the I and R dots together on the display tube face 100, independently of the displayed pattern.

It was remarked earlier that the base level 104 of waves H, and 102 of waves V determines the position of the I dot, and that the amplitudes 106, 105 of these waves determines the position of the R dot.

The D.-C. position of the H base level 104 is shifted as desired by changing the setting of H position control 326 thus changing bias on grid 325 of cathode follower 324 via cathode follower 327. This shift is independent of the other position controls, such as 207, which are in other channels, or are inserted after switching and mixing, so that the I dot may be superposed horizontally on any point of the display for reference, and the R dot will follow at whatever separation has been determined by the setting of switch 318 which determines the horizontal coordinate distance between the R dot and the I dot, and thus measures the time interval on the horizontal or time axis of the display. Dot positioning can be achieved by use of a potentiometer, cathode follower, or any other type of D.-C. bias control used to shift the base levels of the dot read-out waves H, V, as will be understood by those skilled in the art, and my invention is not limited to the method shown for obtaining this shift in the H read-out channel.

*Manual read-out switches*

Figure 6:
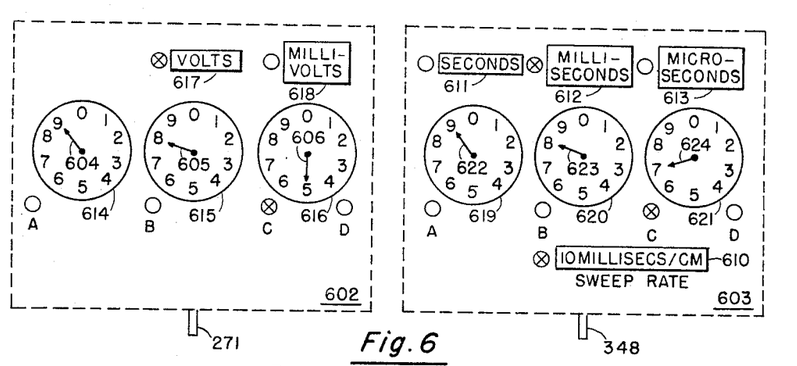
FIG. 6 illustrates the positioning of dots upon a wave pattern, and also illustrates one mode of direct readout utilizing numerical dials, it being understood, however, that numerical drums can be utilized and in fact are preferred; this figure also shows the decimal point position indicating lamps and the measurement unit lamps.

The read-out wave amplitudes must be indicated accurately for exact measurements. For this purpose it is sufficient to provide a switch comprising a calibrated voltage divider with a tap connected to a switch terminal at each position thereof, the switch having an index pointer or window to indicate the digital value of voltage as shown in FIGURE 6.

The read-out switches 318, 418 may be modifications of the well known Kelvin-Varley potentiometer. As shown, switch 318 is composed of three sections 319, 320, 321, each tapped at twelve switch contact points such as 330 to form a series arrangement of eleven equal resistances, such as 340, each having a resistance value "Z."

The arrangement of switch sections as shown for 318 constitutes a three denominational order switch, each order having the usual ten decimal positions, starting with "zero" at position 330 and ending with "nine" at position 339 referring now to section 319. There is a correspondence between the highest order (left hand) dial 619 (FIG. 6) and section 319 of switch 318 (FIG. 3). For example, the digital indication of "nine" by pointer 622 on dial 619 corresponds to switch contact 322 on contact-point 339 of section 319 in H read-out switch 318.

Thus 619 is the digital indicator for section 319 of the H read-out switch, and dials 620, 621 are indicators for switch sections 320, 321. The pointer 622 is mechanically "ganged" with movable switch contact 322 and pointers of dials 620 and 621 are ganged with switch contacts of sections 320 and 321 to obtain digital read-out information from switch 318.

Although indicators 619, 620 and 621 have been described as dials having pointers cooperating therewith, it is preferred that drum type indicators be utilized having windows through which the relevant digit may be viewed.

It will be noted that the switch contacts, for example 322, 323 of the highest order switch section 319 are mechanically ganged. As shown they are in contact with terminals such as 339, 337 and thus include two series resistances 340 having equal resistance magnitudes Z, totaling 2Z in resistance. This is true for any setting. The total resistance of the next lower order switch section 320 is made equal to 2Z so that the parallel resistance of any complete section and the included, tapped resistance of the preceding section has a total value Z. As was indicated above, the moving contacts 322, 323 of section 319 are kept exactly 2Z apart in resistance as they are switched along the contact terminals from 339 to 330, the ten different steps being therefore always of equal resistance and the measured portion of the voltage wave H being always the exact and proper decimal fraction of H-wave amplitude corresponding to the position of the switch.

Each switch section 319, 320, 321 is arranged in the same way, and has the same resistance value relationship to the next lower order section. There may be as many sections as desired, depending upon the number of significant figures it is desired to read-out in making a measurement. In the embodiment shown, four orders are included, the fourth order comprising a continuous potentiometer 342 which serves for determination of a fourth decimal place by setting and of a fifth decimal place by estimation.

There is no requirement for two spaced contacts on this lowest order element 342 to maintain constant resistance, because the output contact of this switch section is connected directly to the high input impedance grid 325 of cathode follower 324.

The operation of V read-out switch 418 is similar to that of 318 and will not be described further, except to note that only three denominational orders are provided and there is no provision in this embodiment for setting in a fourth (lowest) order as was provided for by potentiometer 342 of switch 318 for the time read-out interval. Switch 418 is used to read-out in units of voltage, usually, rather than in units of time, but can be used to read out other quantities, such as current or distance or anything to which the vertical coordinate of the display corresponds.

*Rise-time measurement*

Figure 7:
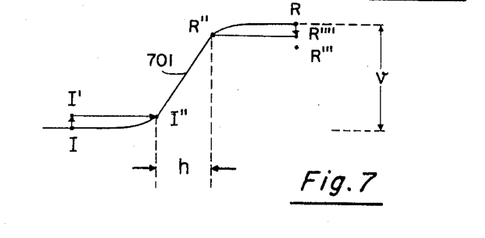
FIG. 7 illustrates the use of the index and readout dots of my invention in measuring rise time.

As is well known in the art, the rise-time of an electric wave is defined as the time interval between the 10% and 90% points of the voltage amplitude rise. As shown in FIG. 7 the rise-time is represented as the horizontal coordinate distance "$h$" between dots I" and R" referring to pattern 701 (displayed on tube face 100). In order to perform a rise-time measurement, the rise-time switch 420 is switched to rise-time position 424 (FIG. 4).

This operation inserts a resistor 421 in series with the resistance of the highest order vertical read-out switch section 422, which resistance is between terminal 439 and ground. The total resistance of section 422 is preferably of the order of 250,000 ohms, or 10 times the fixed value of the individual resistances 423, namely 25,000 ohms. The value of resistor 421 is chosen carefully so that the potential of the read-out waves V at input terminal 439 of the V read-out switch 418 is substantially exactly 80% of the potential appearing at 439 when switch 420 is in position 425. In this embodiment resistor 421 is 65,500 ohms to compensate for operating conditions of triode 426 under the two different conditions of anode loading produced by switch 420 in positions 424 and 425.

The vertical coordinate distance between dots I″ and R″ (FIG. 7) when switch 420 is on position 424 will be 80% of that between dots I and R, the position of which was adjusted by means of V read-out switch 418, with switch 420 in position 425. The adjustment mentioned is a necessary preliminary to making a rise-time measurement, and assures that I coincides with the lowest amplitude of display 701, and R with the highest amplitude of display 701. When switch 420 is switched from position 425 to 424 for making a rise-time measurement, the R dot moves to position R‴. The V read-out switch 418 or V dot position control 261 must not be changed when switch 420 is in this position, or the 100% peak reference represented by the vertical coordinate separation "v" of I and R in FIG. 7 will be destroyed. This type of mistake can be avoided by providing a mechanical interlock between 420 and 418, so that when 420 is on position 424, the V read-out switch 418 will not operate, and the H and V dot positioning controls 326, 261 (which are preferably operated by a single "joy-stick") will not operate.

Also, in order to perform a rise-time measurement, the fixed position of the V read-out wave base level 102 (FIG. 1) must be raised by 10% of "v" so that the vertical position of the index dot I is shifted to I′; and that of R, from R‴ to R⁗, and is now at 10% of "v" plus 80% of "v," making 90% of "v" with reference to I. The V read-out waves from the lowest order contact 441 of switch 418 are applied to grid 442 of cathode follower 443, a corresponding portion of their negative going amplitude being applied to conductor 444 and through capacitor 450 to diodes 428, 429. These diodes produce a small positive potential at terminal 426 when ganged contact arm 445 of switch 420 is connected thereto.

The switch 420 when on position 424 disconnects resistor 427 from ground and connects it to switch terminal 426 in series with diodes 428 and 429 and the polarity reversing switch 440. The small positive potential derived at terminal 426 is applied via resistor 427, polarity reversing switch 440, and terminal 446 to a "chosen" resistor 260 and the grid 263 of cathode follower tube 264 which supplies a corresponding small positive potential to one input channel 265 of dual D.-C. amplifier 266. This D.-C. bias is superposed on the positioning bias from 261 and is made equal to one-eighth the magnitude of any negative going amplitude V-wave supplied to the other channel 269 or 266. V-wave signals are applied to this other channel via conductor 444, switch 440, terminal 447, and grid 267 of cathode follower tube 268.

Resistor 260 can be "chosen" relative to resistor 427 to produce substantially an eight to one ratio between A.-C. negative going potential on 269 and D.-C. positive bias on 265, which corresponds to a 10% shift in the base level 102 (FIG. 1 of the V waveform).

*Transmission of V-waves and their base level to V-deflection plates*

The signal supply arrangement for the D.-C. amplifier 266 is unusual in that although 266 has push-pull symmetry for push-pull A.-C. or D.-C. signals, its input conductor 265 is supplied with a D.-C. base level signal while input conductor 269 is supplied with an A.-C. read-out amplitude signal having a fixed D.-C. level.

This particular dual amplifier structure 266, one channel of which carries A.-C. information and the other channel of which carries D.-C. information derived from a polarity reversing switch 440 is the subject of an application entitled "Read-Out Injection and Polarity Inversion," Serial No. 49,723, filed August 15, 1960, now Patent No. 3,108,204, in the name of Fred L. Katzmann and assigned to the same assignee as the instant application.

Signals on conductors 265 and 269 are ultimately applied to deflecting plates 304, 303 respectively, of the usual pair of plates, after amplification in their respective separate channels through the amplifying elements of amplifier 226, electronic switch 220 and vertical amplifier 308.

In order that these signals coact to deflect the beam 305 in the same "sense" to obtain the rise-time measuring display shown at I″, R″ in FIGURE 7, rectifier 428, 429 are poled to derive a positive bias from a negative-going V read-out wave. By means of polarity reversing switch 440, conductors 265, 269 normally connected through terminals 446, 447, respectively to contact arms 451, 452 can be reversed and connected through terminals 449, 448 respectively to contact arms 452, 451 respectively. This reverses the input connections to dual amplifiers 266 and produces read-out waves V′ with base level 103 (FIG. 1) in place of V-waves with base level 102. In this case, resistor 262 rather than 260 becomes the "chosen" resistor relative to resistor 427 to produce the proper rise-time D.-C. base level 103 at substantially a one to eight ratio between the negative A.-C. amplitude of vertical read-out waves V′.

Normally, for positive right side up displays on tube face 100, conductor 269 conveys the V amplitude information through one channel of dual amplifier 266 to the grid 217 of tube 213 in the electronic switch arrangement 220; and conductor 265 conveys the base level information through the other channel of dual amplifier 266 to the grid 216 of tube 212. The V amplitude information positions the R dot vertically with respect to the I dot and the V base level information positions both the I dot and the R dot vertically.

By the action of switch tubes 208, 209 heretofore described, this dot information is caused to alternate on a time-sharing basis with the display information conveyed by tubes 205, 206 so that on the occurrence of negative-going switching waves 210 the tubes 205, 206 are conductive and a push-pull display signal is applied to the V-deflecting plates 303, 304 to produce an upright display on tube face 100. On the occurrence of positive-going switching waves 210, the tubes 205, 206 are cut off, but negative-going switching waves 211 cause tubes 213, 212 to become conductive and to transmit dot-producing waves to deflecting plates 303, 304.

*Display sweep*

Figure 3:
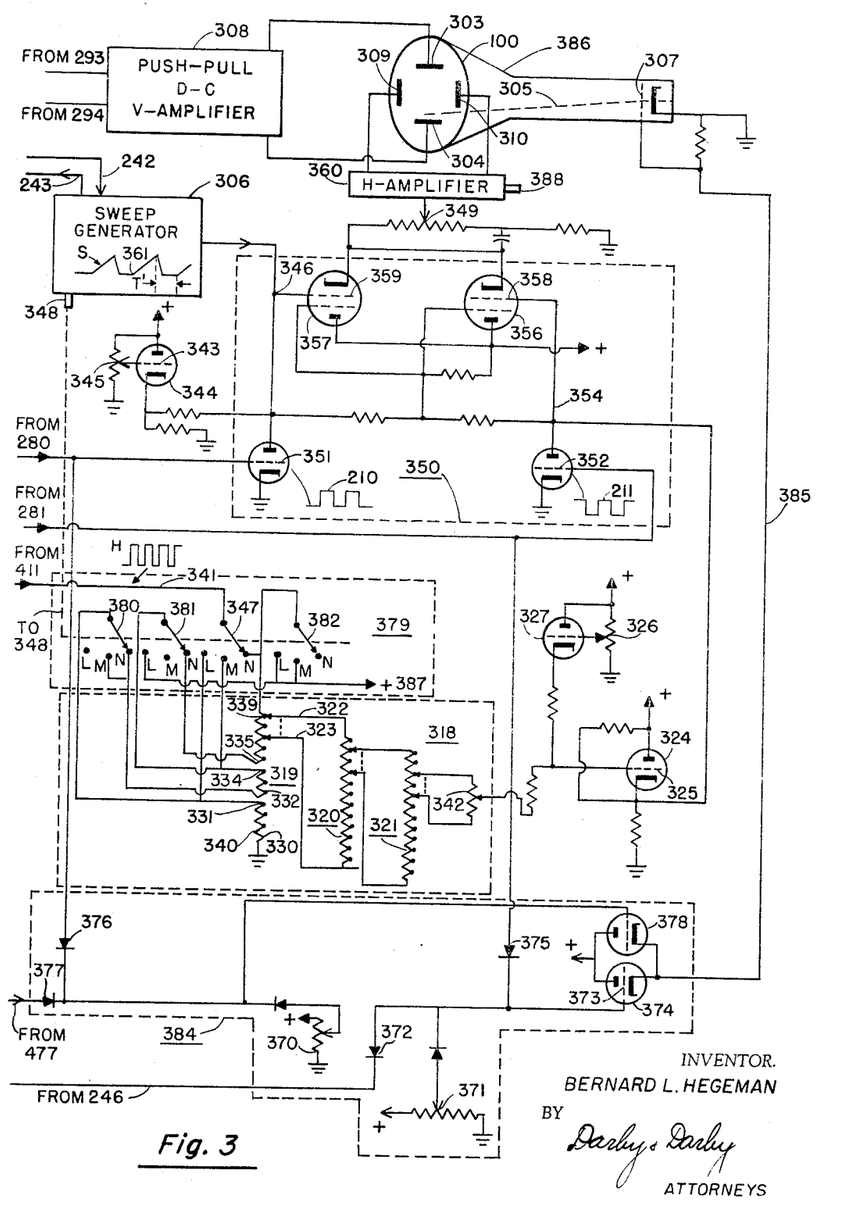
Figure 4:
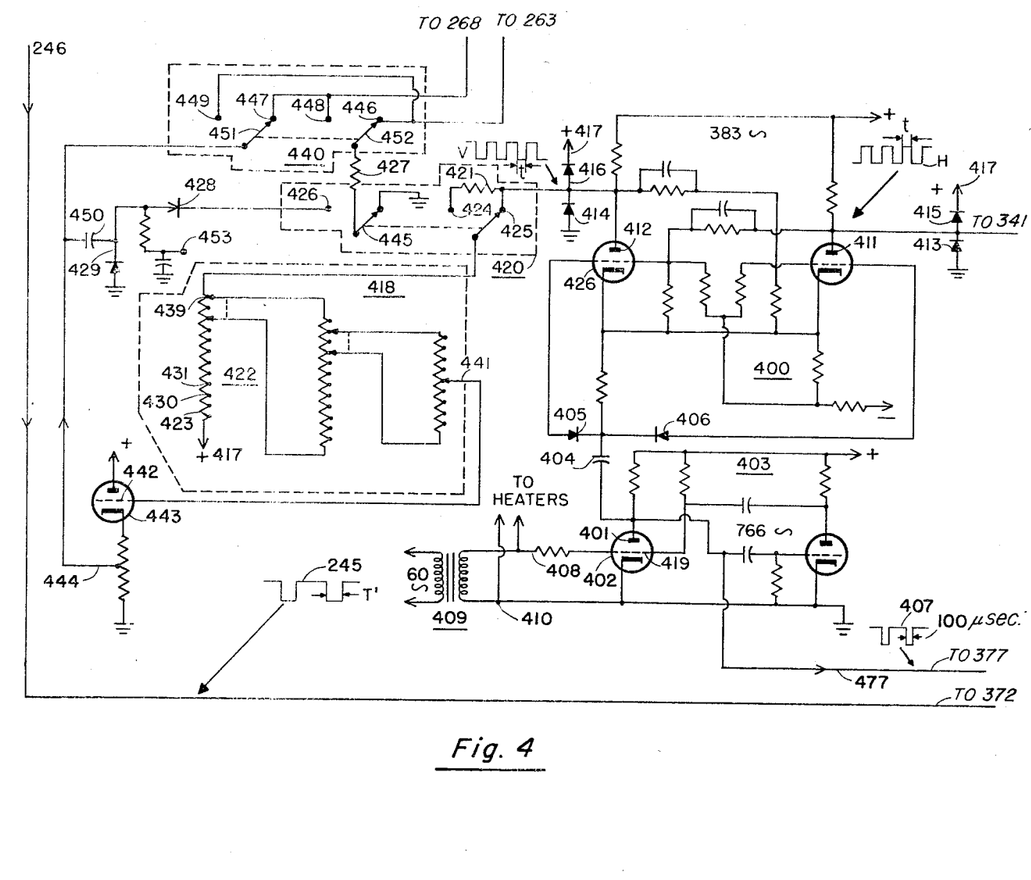

The H-deflection of electron beam 305 during the presentation of the display wave 201 on tube face 100 is produced by the usual triggered linear sweep wave shown at S (FIG. 3). As is customary in cathode ray oscillography the sweep rate is variable and therefore the sweep generator 306 has a sweep rate (time/cm.) switch. The shaft 348 of this switch has 24 positions. On each position the time rate per cm. of deflection is adjusted by capacitance-resistance time-constants, in the well known manner familiar for sweep generators in prior art, to produce a voltage wave S at output connection 346, having correspondence between time and distance, as shown in columns 2 and 3 of Table I, which follows:

TABLE I.—H-TIME-RATE (TIME/CM.) SWITCH SHAFT 348 POSITION FUNCTIONS
(FIGURE 3)

| Sweep-Rate (Time/cm.) Switch Position | | Total Time for Full Scale Sweep (10 centimeters) | Read-Out "Time Units," Lights "on" | Decimal Position. Lights "on" | Read-Out (Full Scale) | Vernier (Max.) |
|---|---|---|---|---|---|---|
| Arm 347 | Shaft 348 | | | | | |
| 1 | 2 | 3 | 4 | 5 | 6 | 7 |
| L | 1  | 20.00 sec       | Seconds      | C | 19.9  | 9 |
| N | 2  | 10.00 sec       | do           | B | 9.99  | 9 |
| M | 3  | 5.000 sec       | do           | B | 4.99  | 9 |
| L | 4  | 2.000 sec       | do           | B | 1.99  | 9 |
| N | 5  | 1.000 sec       | do           | A | .999  | 9 |
| M | 6  | 500.0 millisecs | Milliseconds | D | 499.  | 9 |
| L | 7  | 200.0 millisecs | do           | D | 199.  | 9 |
| N | 8  | 100.0 millisecs | do           | C | 99.9  | 9 |
| M | 9  | 50.00 millisecs | do           | C | 49.9  | 9 |
| L | 10 | 20.00 millisecs | do           | C | 19.9  | 9 |
| N | 11 | 10.00 millisecs | do           | B | 9.99  | 9 |
| M | 12 | 5.000 millisecs | do           | B | 4.99  | 9 |
| L | 13 | 2.000 millisecs | do           | B | 1.99  | 9 |
| N | 14 | 1.000 millisecs | do           | A | .999  | 9 |
| M | 15 | 500.0 microsecs | Microseconds | D | 499   | 9 |
| L | 16 | 200.0 microsecs | do           | D | 199   | 9 |
| N | 17 | 100.0 microsecs | do           | C | 99.9  | 9 |
| M | 18 | 50.00 microsecs | do           | C | 49.9  | 9 |
| L | 19 | 20.00 microsecs | do           | C | 19.9  | 9 |
| N | 20 | 10.00 microsecs | do           | B | 9.99  | 9 |
| M | 21 | 5.000 microsecs | do           | B | 4.99  | 9 |
| L | 22 | 2.000 microsecs | do           | B | 1.99  | 9 |
| N | 23 | 1.000 microsecs | do           | A | .999  | 9 |
| M | 24 | .5000 microsecs | do           | A | .499  | 9 |

*Switching the display sweep*

As is obvious from the foregoing discussion the display pattern and the read-out dots are alternately presented on tube face 100. In order to accomplish this the display sweep and H read-out waves are alternately applied to the horizontal deflection plates 309, 310.

When switch wave 210 is applied to grid 222 of the vertical electronic switch 220 (FIG. 2), it is also applied to grid 351 (FIG. 3) of the horizontal electronic switch 350. When switch wave 210 is positive in polarity the potential developed on conductor 346 drives grid 359 of tube 357 in the horizontal electronic switch 350 to cutoff, so that wave S is not supplied to the input of H-deflection amplifier 360 during this time. Switch wave 211 is at this time negative as applied to grid 352 and causes grid 358 to become positive and make tube 356 conductive. The action of electronic switch 350 is similar to that of electronic switch 220, except that 220 is more complex because separate pairs of signals on two pairs of grids 203, 204 and 217, 216 are switched two and two by switch 220; whereas separate single signals on grids 359 and 358 are switched one and one by means of switch 350. Thus, display sweep wave S is caused to alternate with readout wave H, on H-deflection plates 309, 310, while display waves 201 alternate with V-read-out wave amplitudes and base levels on V-deflection plates 303, 304. Therefore, on tube face 100 the display and the dots are produced alternately by the timed coaction of the V-deflection waves with the H-deflection waves on electron beam 305.

*Indication of units of measurement and placement of decimal point*

Whereas in the past it was necessary to compute the value of the smallest scale division on both coordinate axes and estimate the position of the display within that smallest division, the present invention directly indicates both the numerical value and unit of measurement for any settings of the time/cm. and volts/cm. switch shafts 348 and 271 respectively.

The maximum amplitude of H-read-out waves always corresponds to maximum sweep and an arrangement is needed to assure that the maximum value of read-out units always corresponds to the time required to complete the maximum sweep. For example, when the sweep rate is at one second per cm., and if there are 10 cms. of H-sweep across tube face 100, it is necessary that the H-read-out system indicate 10 seconds of time interval when the index dot I is at the extreme lefthand position (or starting point 361 of wave S) and the read-out dot R is at the extreme right of the sawtooth sweep trace on tube face 100.

Shaft 348 is a control for a plurality of contact arms each cooperating with a switch bank, the array of switches accomplishing a variety of connections to produce desired indications of units of measurement and position of decimal point, in the preferred embodiment of this invention. The time/cm. switch controlled by shaft 348 includes contact arms 347, 380, 381, 382 of multi-bank switch 379 which repetitively engage contacts designated N, M, L of respective banks (FIG. 3) successively (see also column 1 of Table I). N, M, L are connected to points on potentiometer 319 to produce different load impedances for the circuit connected between conductor 341 and ground.

The full voltage output of the H-wave on conductor 341 is applied by connection of moving contact 347 to contacts N, M, L which have a fixed connection to different portions of the highest order switch section, corresponding to maximum time of sweep in the ratios 10:5:2; these being the usual ratios of the time/cm. scales as shown in column 3 of Table I.

Generator 400 is a constant voltage generator by reason of the low impedance of clamping diodes 413, 415. Therefore, although the impedance connected to 341 is modified from 50,000 ohms in contact position L to 125,000 and 250,000 ohms in positions M, N, respectively, the maximum voltage for deflecting the R dot to the edge of the tube face 100 remains the same on all positions L, M, N.

When contact arms 347, 380, 381 and 382 of switch 379 are on position L the maximum H read-out voltage wave is applied to terminal 331, whereas in position M to terminal 334, and in position N to terminal 339. Thus, in position L the maximum effective digital setting of the highest order read-out switch section 319 is at the digital value 2; and in position M it is at the digital value 5, while in position N it is at the digital value 10.

It follows, therefore, that when the switch 379 is in position L the effective settings of the highest denominational order switch section can be only at digital values of 2 or lower. In position M the effective settings can be only at digital values of 5 or lower; and in N, only at digital values of 10 or lower.

The maximum read-out voltages obtained for I and R dot separation, by use of the digital switch, will then correspond to the time interval for maximum deflection at the selected position of the sweep rate time/cm. switch shaft 348.

There are obviously many ways in which full screen deflection and full scale read-out amplitudes can be made to correspond: only a preferred embodiment has been shown in FIGURE 3 and Table I for purposes of explanation, and my invention is not limited thereto. The read-out voltage amplitude at every switch position corresponds to a full scale deflection time interval and thus the time unit must be indicated in each position as shown, for example, in column 4 of Table I, and as may be indicated by lights switched "on" behind the time unit indicators arranged near the read-out dials and shown at 611, 612, 613 of FIG. 6.

The decimal point position may be indicated, as is obvious to those skilled in the art, by employing a multi-section, multi-position switch, controlled by shaft 348, to turn lights "on" and "off" at the various positions as shown in column 5 of Table I (and at A, B, C, D in 603 of FIG. 6).

Referring to Table I when switch shaft 348 is on position 7 (col. 2), for example, a scale fixed for rotation with shaft 348 and lighted by a dial light indicates time/cm. scale (610, FIG. 6) of 20 millisecs./cm., and switch contact 347 is connected to position L. A light behind stationary time unit indicator 612 comes "on" to indicate that the horizontal read-out switch 318 is reading in milliseconds; and the decimal light D comes "on" to indicate that the reading of the read-out switch 318 is a whole number. The maximum read-out that can be obtained on position 7 is 199.9 as shown in columns 6 (and 7) Table I.

It is to be noted that although the maximum digital settings have been described as being 10,000, 5,000 and 2,000 in positions N, M, L, actually these maximum effective settings are 9,999, 4,999 and 1,999 as shown in columns 6 and 7 of Table I. This results from a desire to limit the number of denominational orders, while substantially maintaining the ratios 10:5:2 as previously discussed.

It may be desirable to confine the movement of contacts 322, 323 of section 319 of the read-out switch 318, by a mechanical stop, for example, so that contact 322 cannot advance beyond terminals 331, 334 or 339 when contact arm 347 is on L, M, N respectively, in order to avoid confusion in H read-out values. Such confusion might occur, for example when the R dot is at the extreme right side of the tube face 100, corresponding with the end of display sweep S, and when read-out switch 318 is at the maximum setting for indicating the maximum time interval T (FIG. 6) corresponding to sweep S. The maximum read-out numerical value corresponds to 9,999, 4,999, or 1,999 (as explained above) depending on whether contact 347 is on position N, M, or L.

Normally, there are no stops to switch 318. When a maximum read-out value is 9,999, with contact 347 in position N, and if the operator erroneously attempts to move the R dot further to the right by means of switch 318, the dot will move back to the left to a position corresponding to a lesser read-out digit, and the error becomes manifest, and thus there is no confusion. When a maximum read-out valve is 4,999 or 1,999, a further movement of the switch section 319 up to the value 9 cannot move the R dot since maximum read-out voltage has been obtained already, due to the position of contact 347 at M or L. A movement beyond 9 is in error, and has the same effect as discussed above in connection with the valve 9,999.

A preferred means to avoid this possible confusion in H read-out values is shown in FIGURE 3. By this means the read-out dot R is caused to disappear from the tube face 100 when the highest denominational order section 319 of switch 318 is moved beyond the maximum read-out position L, when contact arm 347 of switch 379 is on contact L; or position M, when contact arm 347 is on contact M.

By means of these contact arms 347, 380, 381, 382 when switch 379 is in position L the series impedances between terminals 331 and 339 are disconnected from 331. At this time a source of positive voltage 387, much greater than the maximum amplitude of H read-out waves available at 341, is connected to terminals 339 and 334 by means of contact arms 382 and 381 respectively. Thus when moving contact 322 is connected to any higher digital contact position beyond 331 a sufficiently high positive voltage 387 is applied to grid 325 of cathode follower 324 and to the H read-out wave channel to deflect the R dot off of the tube face 100 (in this case far to the right). As heretofore described H read-out waves are at this time applied directly to terminal 331 by way of switch arm 347.

Likewise, when switch 379 is in position M, the series impedances between terminals 334 and 339 are disconnected from 334 and connected to positive source 387, and H read-out waves on conductor 341 applied to 334. When moving contact 322 is connected to any digital contact position beyond 334, the high positive potential 387 is applied to the H read-out wave channel to deflect the R dot off of the tube face. The method of causing the R dot to disappear for read-out wave amplitudes greater than maximum prevents the above mentioned confusion which would occur if the R dot moved to the edge of the display and then became stationary while the read-out switch position was advanced to maximum digital position. It is seen that the R dot, when visible, will always move when the read-out switch positions are changed, and that there is a one-to-one correspondence between R dot positions and read-out numerals.

This particular configuration of switching impedances and voltages, embodied in switch 379 as controlled by shaft 348, to set up an unambiguous correspondence between maximum sweep time and maximum read-out numerals is the subject of an application entitled "Read-Out Correlation," Serial No. 49,577, filed August 15, 1960, now abandoned, in the names of Bernard L. Hegeman, Fred L. Katzmann, and Meyer Maron and assigned to the assignee of the instant application.

In the embodiment produced by applicant's assignee the read-out dials are equipped with ground contact switch terminals, each connected to an external plug terminal for operating external relays of printing devices, so that external read-out information may be transferred to distant points at the same time that the visual read-out dial information is available to the dot-position operator. The time unit indicator light switches and decimal light switches are double poled to make a ground contact closure for providing an external printer with measuring unit and decimal point information also. Moreover, an analog signal corresponding to the digital information may be transmitted to a distant point by integrating the signal appearing at point 429 (FIG. 4) which is proportional to the H read-out signal and supplying that integrated signal to output terminal 453 (FIG. 4).

*Horizontal expansion of pattern*

An important feature of the dot read-out system described herein is the provision of means to improve the resolution or accuracy that can be achieved by an operator in setting the dots at desired points on the display.

The H-amplifier 360 in FIG. 3 is equipped with a gain control operated by shaft 388 which is used to increase the gain of the H-amplifier by a larger factor, for example, by a factor of 5 in this embodiment. Both the H read-out waves and the display sweep waves will be increased the same amount by using this control, so that effectively the H-scan amplitude is increased by a factor of 5; and the maximum sweep which is normally 10 cm.

will be increased to 50 cm. When the display screen 100 is limited to 10 cm. of viewing space, however, due to the physical size of cathode ray tube 386, both the left and right edges of the display and any dots superposed thereon will disappear from the screen.

The left-hand portion of the display may be repositioned and brought back into view by use of the pattern position control 349, and the index dot can then be more accurately set at the desired point on the display by means of its positioning controls 326, 261. Since this setting is made on an expanded pattern, but with dots and display lines of normal width determined by the size of the beam 305, the accuracy of the setting will be improved. In a similar manner the R dot can be more accurately set in the expanded position when the pattern is repositioned to bring the R dot into the field of view. Thus, although only one dot is visible for each of these expanded settings, the digital readings of the read-out switches will still indicate the actual separation of the dots in time, and the resolution of setting the dots on the pattern is improved.

Even if shaft 388 operated a variable gain control instead of a fixed-factor control, it is obvious that the resolution of a setting can be improved by such use.

While the expansion of the waveform horizontally has been described it will be understood that the waveform display may be similarly expanded in the vertical direction.

Blanking and intensity

Blanking of the cathode ray tube 386 is accomplished in any well known manner. In this embodiment the triggered sawtooth wave S is synchronized by the signal from display wave amplifier 200, or other signal source, via connections 240, 241, 242 to initiate at time 361 (FIG. 3) and to continue at a time rate i.e. (on the slope S) determined by well known circuits the time constants of which are adjustable by means of the switch shaft 348. The sweep generator 306 initiates blanking pulses in generator 244, via sync connection 243. These are preferably negative blanking (positive brightening) pulses as shown at 245 (FIG. 4) and appear at output 246. The duration T' of a pulse 245 corresponds to the time T' of wave S (FIG. 3). Pulses 245 are applied over conductor 246 (FIGS. 2, 4 and 3) to the cathode of diode 372 and to grid 373 of cathode follower 374. The resultant negative pulse from the cathode of 374 (when 374 is conductive) is applied via conductor 385 to the control grid 307 of cathode ray display tube 386 to cut off the beam 305.

In order to intensify beam 305 while the display wave 201 is "keyed-in," (i.e., when switch wave 210 is negative) switch wave 211 of positive polarity is applied through diode 375 to grid 373 of cathode follower 374, and the positive portion of brightening wave 245 is applied through diode 372 and is transmitted over 385 to grid 307. When the dot read-out waves are "keyed-in," switch wave 210 of positive polarity is applied through diode 376 to make cathode follower 378 conductive, and a read-out brightening wave 407 is applied through diode 377 to cathode follower 378 over conductor 385 to control grid 307, to intensity beam 305. The negative part of wave 407 (with negative duration of approximately 100 microseconds, and of frequency 766 cycles) cuts off beam 305 during the steep slope of read-out waves H and V. Thus the beam is blanked during the short transition period between the dot presentations on tube face 100, and "tails" on the dots are prevented.

If the beam 305 is maintained at constant intensity during the presentation of the display and the dots, then the dots may appear undesirably bright relative to the displayed wave on tube face 100. To avoid this the master clock time-sharing switch waves 210, 211 may be changed from square to rectangular waves having shorter durations for positive values of 210 than for positive values of 211.

However, in the preferred embodiment here disclosed a simpler means for adjusting the relative brightness of the display and dots is utilized. This simpler means comprises the circuit 384 including diodes 376, 377, 372, 375, controls 370, 371, and cathode followers 374, 378. This circuit constitutes a Z-axis switch which cooperates (as has been described) with the X-axis switch 350 (horizontal switch) and Y-axis switch 220 (vertical switch).

Figure 5:
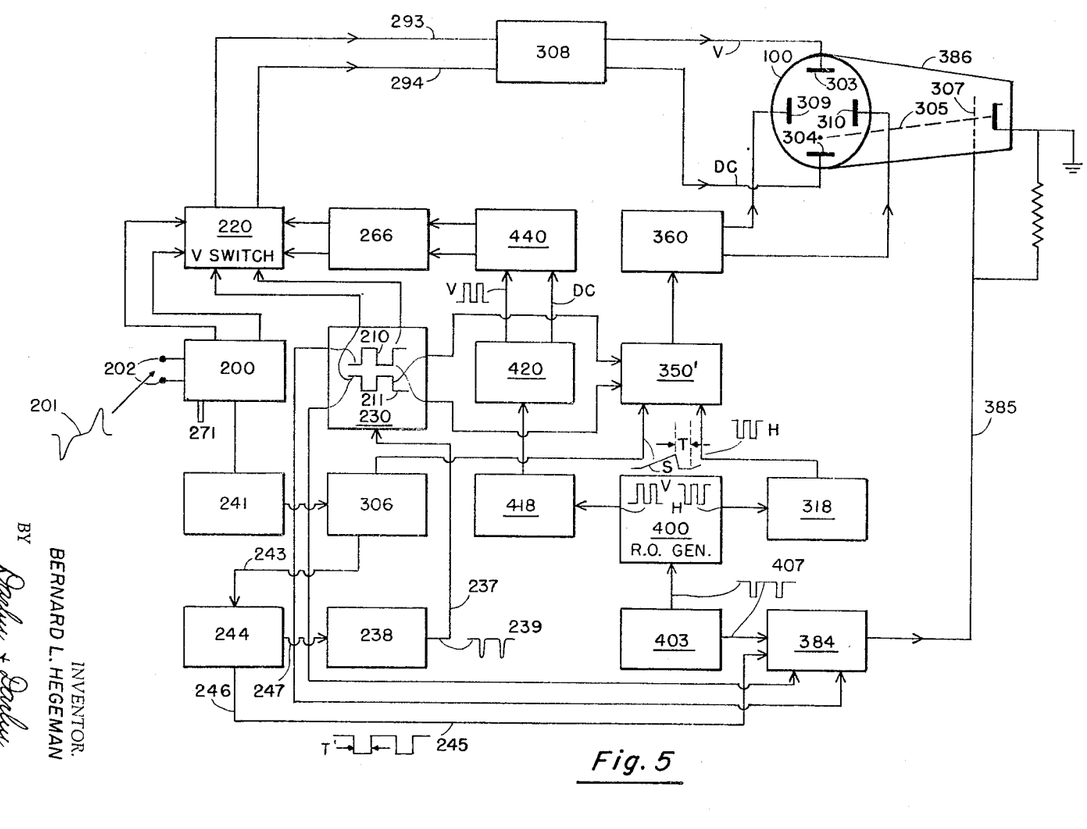
FIG. 5 is a schematic block diagram of the circuits of FIGS. 2, 3 and 4.

Referring now to FIG. 5 when master clock wave 210 switches in the display wave 201 through switch 220 to deflection plates 303, 304, and switches in the sweep wave S through switch 350 to deflection plates 309, 310 (as described hereinabove), it also switches in the brightening (or blanking) waves 245 and intensity control 371, all associated with the display wave 201.

When master clock wave 211 switches in the V read-out wave amplitudes and base levels through switch 220 to deflection plates 303, 304, and switches in the H read-out waves through switch 350 to deflection plates 309, 310, it also switches in the brighening (or blanking) waves 407 and intensity control 370, all associated with the read-out waves, H and V.

Therefore, when the display is on tube face 100 its intensity may be controlled by adjustment 371 which acts through cathode follower 374 to change the bias on control grid 307. When the dots are on tube face 100, their intensity may be controlled by adjustment 370 which acts through cathode follower 378 to change the bias on control grid 307.

Circuits similar to those described above may also be used to control the brightness of any two related or unrelated displays presented on a single gun tube. The details of this Z-axis switch and its cooperation with the brightness control means and blanking means are not described herein, since they form the subject matter of an application entitled "Time Shared Oscilloscope," Serial No. 55,014, filed September 9, 1960, now Patent No. 3,178,606, in the name of Fred L. Katzmann and assigned to the assignee of this application.

Description of a read-out operation

The actual operation of the preferred embodiment of this invention in making a typical read-out measurement is explained below. In this explanation reference is made to FIG. 6, where a typical display wave 201, having an amplitude substantially equal to 100 volts and requiring time T for its completion, and the dots I and R are shown on tube face 100.

The display 201 is synchronized with the display sweep at an appropriate time rate by means of time/cm. switch control shaft 348, that one of the twenty-four switch positions being arbitrarily selected which gives the desired display time separation between points of interest 600 and 601.

The display amplitudes are adjusted to arbitrary levels 600, 601 by means of amplitude control switch shaft 271 (FIG. 2), which is used to adjust the gain of amplifier 200 to an appropriate level in volts/cm. of vertical deflection. The volts/cm. switch shaft 271 for the vertical dimension corresponds to the time/cm. switch shaft 348 for the horizontal dimension, but the switch position gain ratios for different positions of 271 are always 1:10:100, rather than 2:5:10, as for the positions of 348. Thus, it is necessary in this embodiment only to change the decimal point position lights and the potential unit indicator lights by means of shaft 271, no mechanical tie-in with switch 418 being needed.

Since the display peaks as shown are of a magnitude of almost 100 volts, the "volts" potential unit light 617 and the "C" decimal light in the vertical read-out dial arrangement 602 are lighted (designated by X in FIGURE 6) as a consequence of the adjustment of shaft 271 to obtain the almost full scale display 201 as shown.

The arbitrary setting of the display sweep rate (time/cm.) switch has positioned it at an appropriate value near $T/10$ cm., to include the time interval to be measured, for example the time interval between negative peak 600 and positive peak 601. For example, when display 201 is assumed to be at 10 cycles, $T/10$ will be of the order of $\frac{1}{100}$ second, or 10 milliseconds/cm. Therefore, the time/cm. switch shaft 348 will have been set at position 8 (10 milliseconds/cm.) and the "millisecond" light 612 and the "C" decimal point light will be lighted in the horizontal read-out dial arrangement 603.

Figure 2:
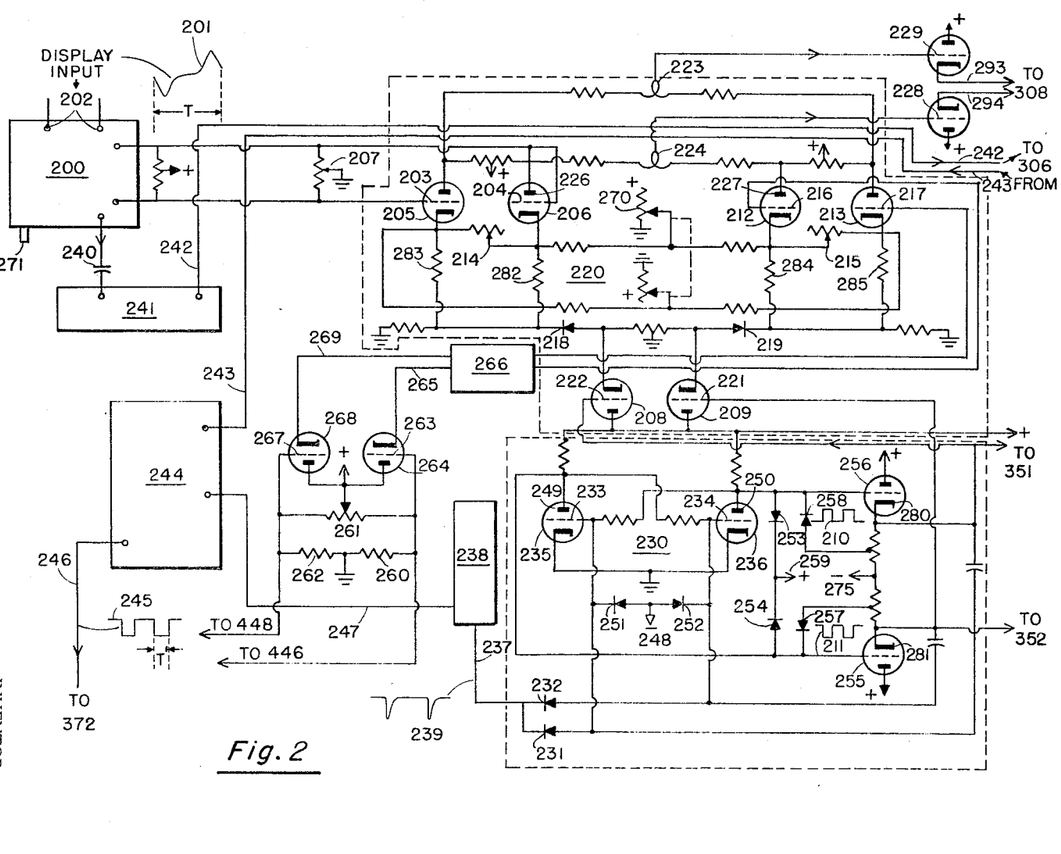
FIGS. 2, 3 and 4, taken together, form a schematic diagram of a preferred form of my invention.

The display 201 is shown as having been positioned symmetrically (centered) on tube face 100, for convenience of observation, this being done by means of the H and V display positioning controls 345 (FIG. 3) and 207 (FIG. 2). The index dot I is set on peak 600 by adjustment of the H and V dot-positioning controls 326 and 261, which may be arranged for "joy-stick" operation.

The R dot is superposed on peak 601 by the operator, by moving the H read-out contacts of switch 318 and the V read-out contacts of switch 418. The numerical values are shown by pointers 604, 605, 606 of unit 602, and by pointers 622, 623, 624 of unit 603, the units of measurement and decimal points being as above described.

By reference to FIGURE 6, it will be seen that pattern 201 has a peak-to-peak amplitude of 98.5 volts and a peak-to-peak time interval of 98.7 milliseconds.

The entire pattern of display 201 and dots I and R may be moved at will by means of either the H pattern position control 349 or the V pattern position control 270, or both, to obtain more convenient observation without disturbing the relation of the dots and the pattern and without causing the read-out values indicated on 602, 603 to change in any way.

I have described my invention and its operation in a preferred embodiment using square wave generators, electronic switches, dial indicators, joy-stick positioners and a cathode ray tube display, but it will be obvious to those skilled in the art that any or all of these devices may be replaced by electrical, mechanical, or other physical or electro-mechanical devices without departing from the spirit of this invention.

What is claimed is:

1. An electrical waveform display system comprising: input terminals for supplying a periodic electrical signal; a display device having a display surface and responsive to said signal for displaying a waveform representative of the waveform of a received signal; means for establishing a reference point on said display surface; adjustable means for developing at least one reference dot and positioning it in two coordinate dimensions at a selected point on the displayed waveform; and means responsive to the adjustment of said last-named means for indicating the two coordinate dimensions from said reference point to said dot.

2. An electrical waveform display system comprising: input terminals for supplying a periodic electrical signal; a display device having a display surface and responsive to said signal for displaying a waveform representative of the waveform of a received signal; adjustable means for developing and positioning an index dot at a first selected point on the displayed waveform; adjustable means for developing and positioning at least one readout dot at a second selected point on the displayed waveform; means responsive to the adjustment of said last-named means for indicating a coordinate dimension between said index dot and said readout dot; and means for simultaneously and similarly adjusting the positions of said electrical waveform and said dots on said display surface.

3. An electrical waveform display system comprising: input terminals for supplying a periodic electrical signal; a display device having a display surface and responsive to said signal for displaying a waveform representative of the waveform of a received signal; means for establishing a reference point on said display surface; means for developing at least one reference dot and including a pair of adjustable means for individually positioning it in two coordinate dimensions at a selected point on the displayed waveform; and means responsive to the adjustments of said last-named two means for individually indicating the two coordinate dimensions from said reference point to said dot.

4. A cathode ray oscilloscope comprising: input terminals for supplying a periodic electrical signal to be analyzed; a cathode ray tube having a display screen and including a pair of deflection means for deflecting the ray in two coordinate directions; a first circuit for applying said signal to one of said deflection means; a second circuit for exciting the other of said deflection means to display the waveform of said signal on said screen; means for establishing a reference dot on said screen; adjustable means for generating two periodic dot-producing signals; third and fourth circuits for individually applying said dot-producing signals to said deflection means for developing and positioning at least one readout dot at a selected point on the displayed waveform; means for alternately energizing said first and second circuits and said third and fourth circuits; and means responsive to the adjustment of said adjustable means for indicating the coordinate dimensions between said reference dot and said readout dot.

5. An electrical waveform display system comprising: input terminals for supplying a periodic electrical signal; a display device having a display surface and responsive to said signal for displaying a waveform representative of the waveform of a received signal; adjustable means for developing and positioning an index dot at a first selected point on the displayed waveform; adjustable means for developing and positioning at least one readout dot at a second selected point on the displayed waveform; and means responsive to the adjustment of each of said adjustable means for indicating one of the coordinate dimensions between said index dot and said readout dot.

6. A cathode ray oscilloscope comprising: input terminals for supplying a periodic electrical signal to be analyzed; a cathode ray tube having a display screen and including a pair of deflection means for deflecting the ray in two coordinate directions; a first circuit for applying said signal to one of said deflection means; a second circuit for exciting the other of said deflection means to display the waveform of said signal on said screen; means for establishing a reference dot on said screen; adjustable means for generating two periodic dot-producing signals; third and fourth circuits for individually applying said dot-producing signals to said deflection means for developing and positioning at least one readout dot at a selected point on the displayed waveform; means for alternately energizing said first and second circuits and said third and fourth circuits; means responsive to the adjustment of said adjustable means for indicating the coordinate dimensions between said reference dot and said readout dot; and unicontrol means for similarly adjusting the positions of said displayed waveform and said readout dot on said screen.

7. A cathode ray oscilloscope comprising: input terminals for supplying a periodic electrical signal to be analyzed; a cathode ray tube having a display screen and including a pair of deflection means for deflecting the ray in two coordinate directions; a first circuit for applying said signal to one of said deflection means; a second circuit for exciting the other of said deflection means to display the waveform of said signal on said screen; means for establishing a reference dot on said screen; adjustable means for generating two periodic dot-producing signals; third and fourth circuits for individually applying said dot-producing signals to said deflection means for developing and positioning at least one readout dot at a selected point on the displayed waveform; means for alternately energizing said first and second circuits and said third and fourth circuits; means responsive to the adjustment of said adjustable means for indicating the coordinate dimensions between said reference dot and said readout dot; unicontrol means for similarly adjusting the positions of said displayed waveform and said readout dot on said screen; a second control means for independently adjusting the position of said readout dot relative to said displayed waveform and said screen; and a third control means for independently adjusting the position of said displayed waveform relative to said dot and said screen.

8. A cathode ray oscilloscope comprising: input terminals for supplying a periodic electrical signal to be analyzed; a cathode ray tube having a display screen and including a pair of deflection means for deflecting the ray in two coordinate directions; a first circuit for applying said signal to one of said deflection means; a second circuit for exciting the other of said deflection means to display the waveform of said signal on said screen; means for establishing a reference dot on said screen; adjustable means for generating two periodic dot-producing signals; third and fourth circuits for individually applying said dot-producing signals to said deflection means for developing and positioning at least one readout dot at a selected point on the displayed waveform; switching means for alternately energizing said first and second circuits and said third and fourth circuits; means responsive to the adjustments of said adjustable means for indicating the coordinate dimensions between said reference dot and said readout dot; and means for varying the frequency of operation of said switching means, thereby to adjust the relative brightnesses of said displayed waveform and said readout dot.

9. A cathode ray oscilloscope comprising: input terminals for supplying a periodic electrical signal to be analyzed; a cathode ray tube having a display screen and including a pair of deflection means for deflecting the ray in two coordinate directions; a first circuit for applying said signal to one of said deflection means; a second circuit for exciting the other of said deflection means to display the waveform of said signal on said screen; means for establishing a reference dot on said screen; adjustable means for generating two periodic dot-producing signals; and third and fourth circuits for individually applying said dot-producing signals to said deflection means for developing and positioning at least one readout dot at a selected point on the displayed waveform, the amount of adjustment of said adjustable means being representative of the coordinate dimensions between said reference dot and said readout dot.

10. A system for position a beam of energy at two selected points on a display surface comprising: a pair of means to deflect the beam in two directions; input terminals for supplying a pair of rectangular electrical waves of the same frequency and with related phase; and means for energizing one of said deflection means solely with one of said waves during a predetermined time interval for deflecting the beam in one direction along said surface and for energizing the other of said deflection means solely with the other of said waves during said time interval for deflecting the beam in the other direction along said surface; means for maintaining said beam at a substantially constant intensity of a value to produce two dots of enhanced brightness only at related rest positions of said energy beam.

11. In a oscilloscope including a cathode ray tube having a display screen, a system for positioning the cathode ray at two selected points on the display screen comprising: a pair of means to deflect the cathode ray in two directions; input terminals for supplying a pair of rectangular electrical waves of the same frequency and with related phase; and means for energizing one of said deflection means solely with one of said waves during a predetermined time interval for deflecting the cathode ray in one direction along said surface and for energizing the other of said deflection means solely with the other of said waves during said time interval for deflecting the cathode ray in the other direction along said surface; means for maintaining said ray at a substantially constant intensity of a value to produce two dots of enhanced brightness only at related rest positions of said cathode ray.

12. A system for positioning a beam of energy at two selected points on a display surface comprising; a pair of means to deflect the beam in two directions; input terminals for supplying a pair of rectangular electrical waves of the same frequency and with related phase; means for energizing one of said deflection means solely with one of said waves during a predetermined time interval for deflecting the beam in one direction along said surface and for energizing the other of said deflection means solely with the other of said waves during said time interval for deflecting the beam in the other direction along said surface; means for maintaining said beam at a substantially constant intensity of a value to produce two dots of enhanced brightness only at related rest positions of said energy beam; and means to adjust the base levels of said waves to adjust the position of one of said dots.

13. A system for positioning a beam of energy at two selected points on a display surface comprising. a pair of means to deflect the beam in two directions; input terminals for supplying a pair of rectangular electrical waves of the same frequency and with related phase; means for energizing one of said deflection means solely with one of said waves during a predetermined time interval for deflecting the beam in one direction along said surface and for energizing the other of said deflection means solely with the other of said waves during time interval for deflecting the beam in the other direction along said surface; means for maintaining said beam at a substantially constant intensity of a value to produce two dots of enhanced brightness only at related rest positions of said energy beam; and means for independently adjusting the amplitudes of said waves, thereby independently to adjust the coordinate dimension between said dots in each direction.

14. A system for positioning a beam of energy at two selected points on a display surface comprising: a pair of means to deflect the beam in two directions; input terminals for supplying a pair of rectangular electrical waves of the same frequency and with related phase; means for energizing one of said deflection means solely with one of said waves during a predetermined time interval for deflecting the beam in one direction along said surface and for energizing the other of said deflection means solely with the other of said waves during said time interval for deflecting the beam in the other direction along said surface; means for maintaining said beam at a substantially constant intensity of a value to produce two dots of enhanced brightness only at related rest positions of said energy beam; means to adjust the base levels of said waves to adjust the position of one of said dots; and means for independently adjusting the amplitudes of said waves, the position of the other of said dots being responsive jointly to the base levels and the amplitudes of said waves.

15. A system for positioning a beam of energy at two selected points on a display surface comprising: a pair of means to deflect the beam in two directions; input terminals for supplying a pair of rectangular electrical waves of the same frequency and with related phase; means for energizing one of said deflection means solely with one of said waves during a predetermined time interval for deflecting the beam in one direction along said surface and for energizing the other of said deflections means solely with the other of said waves during said time interval for deflecting the beam in the other direction along said surface; means for maintaining said beam at a substantially constant intensity of a value to produce two dots of enhanced brightness only at related rest positions of said energy beam; means for independently adjusting the amplitudes of said waves, thereby independently to adjust the coordinate dimension between said dots in each direction; and means for indicating the positions of said adjusting means, thereby to indicate directly said coordinate dimensions.

16. A system for positioning a beam of energy at two selected points on a display surface comprising: a pair of means to deflect the beam in two directions; input terminals for supplying a pair of rectangular electrical waves of the same frequency and with related phase; means for applying one of said waves to one of said deflection means for deflecting the beam in one direction along said surface and for applying the other of said waves to the other of said deflection means for deflecting the beam in the other direction along said surface, thereby to produce two dots at related rest positions of said energy beam; a pair of decade potentiometer networks for independently adjusting the amplitudes of said waves, thereby independently to adjust the coordinate dimension between said dots in each direction; and digital indicators coupled to said potentiometer networks for indicating the numerical values of said dimensions.

17. A system for positioning a beam of energy at two selected points on a display surface comprising: a pair of means to deflect the beam in two directions; input terminals for supplying a pair of rectangular electrical waves of the same frequency and with related phase; means for energizing one of said deflection means solely with one of said waves during a predetermined time interval for deflecting the beam in one direction along said surface and for energizing the other of said deflection means solely with the other of said waves during said time interval for deflecting the beam in the other direction along said surface; means for maintaining said beam at a substantially constant intensity of a value to produce two dots of enhanced brightness only at related rest positions of said energy beam; means for independently adjusting the amplitudes of said waves, thereby independently to adjust the coordinate dimension between said dots in each direction; and means for detecting said adjusted rectangular waves to derive analog signals representative thereof.

18. A system for positioning a beam of energy at two selected points on a display surface comprising: a pair of means to deflect the beam in two directions; input terminals for supplying a pair of rectangular electrical waves of the same frequency and with related phase, the value of said frequency being a prime number greater than 19; and means for energizing one of said deflection means solely with one of said waves during a predetermined time interval for deflecting the beam in one direction along said surface and for energizing the other of said deflection means solely with the other of said waves during said time interval for deflecting the beam in the other direction along said surface; means for maintaining said beam at a substantially constant intensity of a value to produce two dots of enhanced brightness only at related rest positions of said energy beam.

19. A system for positioning a beam of energy at two selected points on a display surface comprising: a pair of means to deflect the beam in two directions; input terminals for supplying a pair of rectangular electrical waves of the same frequency and with related phase; means for cyclically varying said frequency about its mean value; and means for energizing one of said deflection means solely with one of said waves during a predetermined time interval for deflecting the beam in one direction along said surface and for energizing the other of said deflection means solely with the other of said waves during said time interval for deflecting the beam in the other direction along said surface; means for maintaining said beam at a substantially constant intensity of a value to produce two dots of enhanced brightness only at related rest positions of said energy beam.

20. An electrical waveform display system comprising: input terminals for supplying a periodic electrical signal; a display device having a display surface and responsive to said signal for displaying a waveform representative of the wave form of a received signal; means for establishing a reference point on said display surface; adjustable means for developing and positioning at least one reference dot at a selected point on said displayed waveform; means responsive to adjustment of said last-named means for indicating a coordinate dimension from said reference point to said dot; and means operated by said indicating means for developing an electrical signal representative of said coordinate dimension for transmission to a remote device.

21. An electrical waveform display system comprising: input terminals for supplying a periodic electrical signal; a display device having a display surface and responsive to said signal for displaying a waveform representative of the wave form of a received signal; means for establishing a reference point on said display surface; adjustable means for developing and positioning at least one reference dot at a selected point on said displayed waveform; means responsive to adjustment of said last-named means for indicating a coordinate dimension from said reference point to said dot; and means operated by said indicating means for developing digital information corresponding to the setting of said adjustable means and representative of said coordinate dimension for transmission to a remote device.

22. An electrical waveform display system comprising: input terminals for supplying a periodic electrical signal; a display device having a display surface and responsive to said signal for displaying a waveform representative of the wave form of a received signal; means for deflecting the beam of energy; means for establishing a reference point on said display surface; means for generating dot-producing electrical signals and applying the same to said deflection means to develop a reference dot on said displayed waveform; adjustable means for adjusting the amplitudes of said dot-producing signals to position said reference dot on said displayed waveform; means responsive to adjustment of said last-named means for indicating a coordinate dimension from said reference point to said dot; and an output circuit coupled to said signal-generating means for receiving said adjusted signals for transmission to a remote device.

References Cited by the Examiner
UNITED STATES PATENTS

| | | | |
|---|---|---|---|
| 2,449,093 | 9/1948 | Weingarten | 315—23 X |
| 2,482,821 | 9/1948 | Young | 324—121 X |
| 2,524,790 | 10/1950 | Grunwald | 324—121 |
| 2,540,179 | 2/1951 | Somers | 315—24 |
| 2,548,276 | 4/1951 | Weisbecker | 324—121 |
| 2,563,395 | 8/1951 | Carpentier | 324—121 |
| 2,608,683 | 8/1952 | Blewett | 324—88 X |
| 2,640,191 | 5/1953 | Earp et al. | 343—10 |
| 2,643,288 | 6/1953 | Philpott | 324—121 X |
| 2,915,749 | 12/1959 | Goldbohm et al. | 343—10 X |
| 2,950,475 | 8/1960 | Hance | 343—10 |
| 3,019,389 | 1/1962 | Ross et al. | 324—121 X |
| 3,060,427 | 10/1962 | Jaffe et al. | 324—77 |

OTHER REFERENCES

"A Cathode-Ray Tube Frequency Comparator for 1 k.c.s. Sub-Standard Tones," article by F. J. M. Laver, The Post Office Electrical Engineer's Journal, July 1949, pp. 61–64.

WALTER L. CARLSON, *Primary Examiner.*

SAMUEL BERNSTEIN, *Examiner.*

A. E. RICHMOND, *Assistant Examiner.*